United States Patent [19]

Ellis

[11] 3,968,574

[45] July 13, 1976

[54] JOURNALIST TEACHING AID

[76] Inventor: Gary R. Ellis, 1855 Cedar, Apartment 16, Long Beach, Calif. 90806

[22] Filed: Feb. 10, 1975

[21] Appl. No.: 548,815

[52] U.S. Cl.................................. 35/7 R; 33/1 G; 283/56
[51] Int. Cl.².............................. G09B 29/00
[58] Field of Search.................. 35/1, 7 R, 7 A, 8 R, 35/24 R, 24 A, 24 B, 35 R, 35 H; 33/1 G; 283/1 R, 1 A, 45, 46, 56

[56] References Cited
UNITED STATES PATENTS

| | | | |
|---|---|---|---|
| 1,185,995 | 6/1916 | Gibson et al. | 283/56 |
| 1,206,805 | 12/1916 | Bonnet | 283/56 |
| 1,532,379 | 4/1925 | Carter | 283/56 |
| 2,375,427 | 5/1945 | Mannino | 283/45 X |
| 3,099,089 | 7/1963 | Bond et al. | 33/1 G |
| 3,555,702 | 1/1971 | Van Kirk | 35/7 R |

Primary Examiner—William H. Grieb
Attorney, Agent, or Firm—Charles A. Goodall

[57] ABSTRACT

A Journalist Teaching Aid for Journalists is provided which comprises in combination: a plurality of master layout boards constructed of a material such as glossy paper, mylar or the like to permit readily detachably mounting adhesively backed materials thereon, the master layout boards are used to simulate pages of publications such as newspaper, magazines, tabloids, books, and the like; adhesively backed strips of materials such as glossy paper card stock, plastics such as mylar and the like having a plurality of said strips covering a plurality of dimensions for simulating flags, nameplates, logos, headlines, mastheads, artwork and the like used in publishing said pages of publications; adhesively backed strip holders for detachably mounting said strips thereon when not in use; and a plurality of miniature card stock layout boards for use by the journalist in drafting thereon a preliminary page layout. After the preliminary page layout is drafted, the journalist then uses the master layout board and detachably mounts thereon the appropriate simulating strips to permit improved visualization of the completed page of the publication.

8 Claims, 11 Drawing Figures

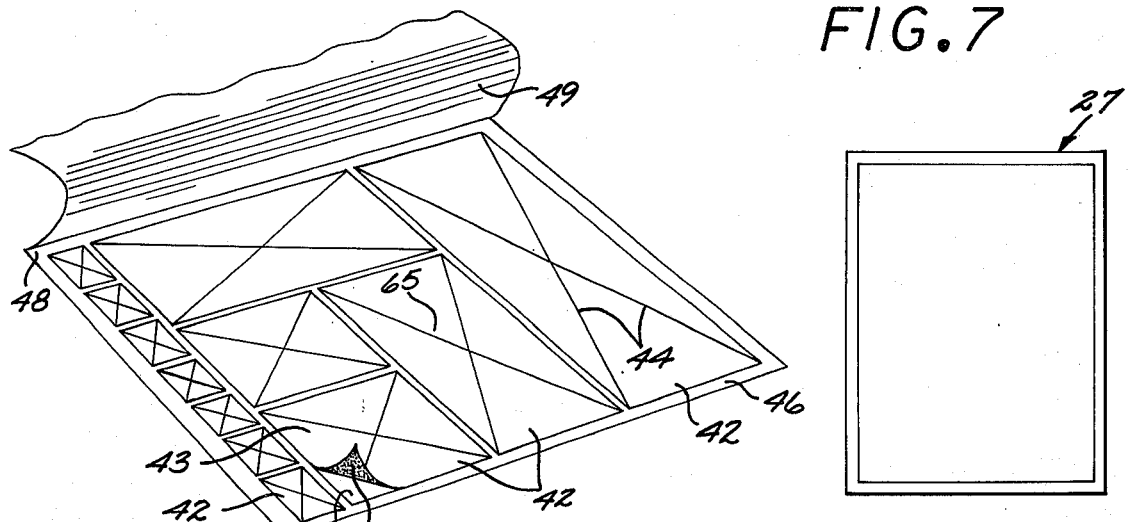
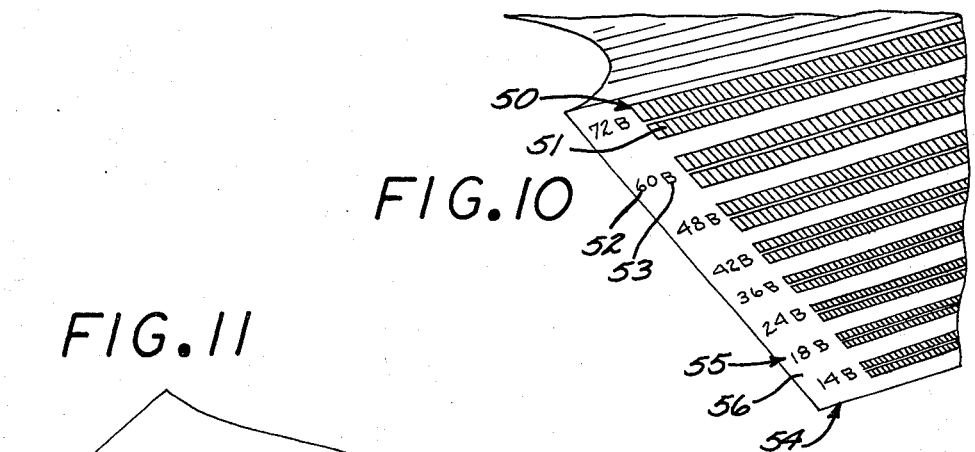
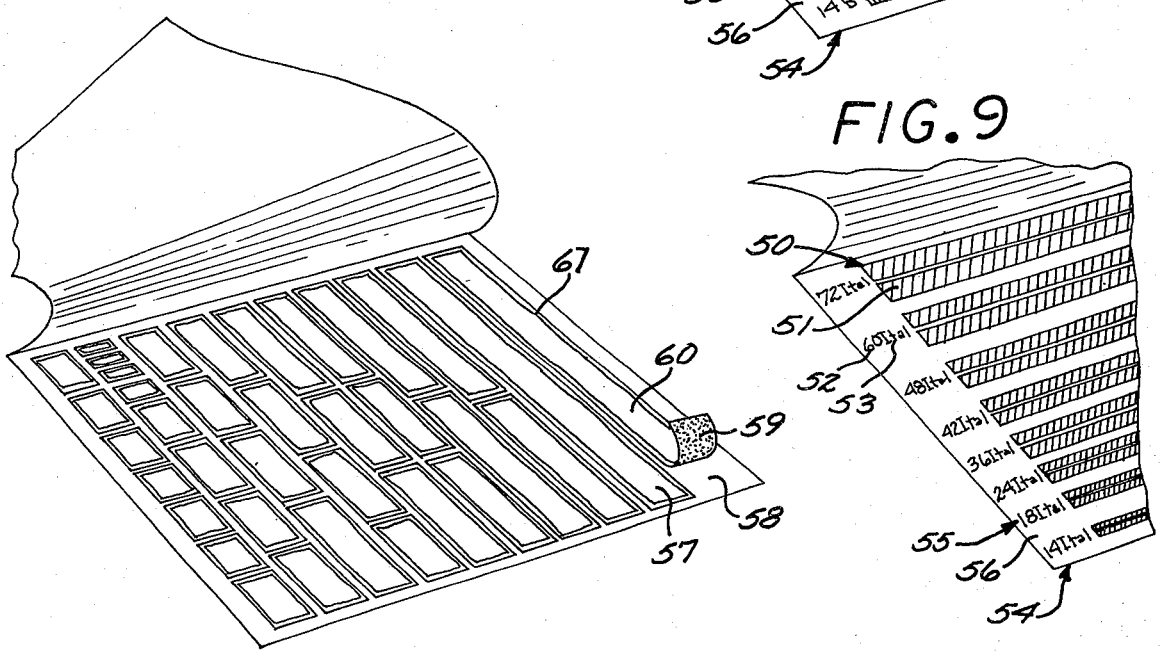

JOURNALIST TEACHING AID

BACKGROUND OF THE INVENTION

1. Field of Invention

This invention relates to a teaching aid in the field of journalism and more particularly to a novel teaching aid for make-up of pages for a printed publication such as a newspaper, magazine tabloid, pamphlet, yearbook, annual, manual and/or book or the like to permit a full-scale visualization of the page prior to finalization of the printed page.

2. Discussion of the Prior Art

Page make-up for printed publications, whether eight column, tabloid, magazine, newspaper, pamphlet, manual, yearbook, book, or annual is a most difficult aspect of journalism to teach students utilizing presently available teaching techniques. The present teaching method employs a miniature layout board replica onto which the student diagrams a page layout or dummy to show the position of stories, headlines, illustrations, and advertisements and the like in pencil. Artwork (illustrations) and the like are indicated by relatively large (illustrations) s drawn through columns across the length and down the depth of the replica covering the number of columns in length and inches in depth the art-work will include in accordance with the scale on the dummy. Areas where headlines are to be located are designated by other suitable means, for example a series of small x's drawn across the replica covering the intended column length and depth of the headline. Other printed matter is simulated by blank spaces within lines drawn from a replica top to a replica bottom setting off the intended printed columns. After the miniature layout board replica is completed, a full-sized dummy is constructed utilizing the same procedures as were used for drafting the miniature dummy. The student journalist rarely sees his completed work in print and therefore visualizing the completed work is difficult if not impossible. professionals learn make-up through trial and error utilizing actual printed materials and artwork not available to the student journalist.

The invention herein, the Journalist Teaching Aid, overcomes these difficulties in teaching make-up to journalist students by providing an aid whereby the student can quickly and easily transfer the concepts penciled on the miniature layout board replica to a full-sized layout board utilizing flag, nameplate, logo, headline and artwork simulating strips and sheets provided with an adhesive backing for detachable mounting as desired on a working surface of a master layout board. The master layout board has a work surface divided into columns as desired by the student and the columns are shaded so as to simulate printed matter. The simulating strips and pages are overlaid onto this master layout board leaving the printed matter simulating columns in uncovered areas. This permits the student to more adequately visualize the completed publication page.

SUMMARY OF THE INVENTION

It is an object of this invention to provide an aid in teaching make-up of written publications. The term make-up is defined as the art or method of assembling various headlines, artwork, flags, nameplates or logos and printed matter together to produce a completed layout for a publication such as a newspaper, magazine, tabloid, yearbook, manual, pamphlet, book or the like.

A master layout board set is provided having included therein one or more master layout boards for simulating full size pages of any or all of the class of publications comprising newspapers, magazines, tabloids, yearbooks, annuals, pamphlets, manuals, books, and the like, each master layout board having work surfaces thereon on a front face thereof and alternatively in addition thereto a work surface on a back face thereof. Each of the said work surfaces being divided into a plurality of columns extending from a master layout top margin to a master layout bottom margin, said columns being formed by relatively narrow column dividing strips. The work surface within the said columns is prepared in a manner so as to simulate printed matter of a publication page by shading the area grey or other appropriately manner of printing designation. The layout boards may be constructed from any of the class of materials comprising plastics, epoxy or plastic coated paper, wood, metal or the like, a surface being prepared to permit readily detachably adhesively mounting adhesive backed materials thereon. There is also provided to be used in combination with said master layout board, a flag nameplate or logo set for simulating the name or title of the publication, a headline simulating set having thereon printed matter consistent with a variety of headline types and sizes of printing, and an artwork simulating set having a hue or shade either lighter or darker than the hue or shade representing printed matter on the said layout board, these sets each comprise a plurality of strips or sheets of adhesively backed material constructed from any of the class of materials comprising glossy paper, plastic or epoxy coated paper or plastics such as mylar or the like, each of said sets having individual strips or sheets covering a variety of dimensions appropriate for simulating the items of a publication for which the set is named herein. Further provided is a miniature layout board replica set having therein included a plurality of small replicas of the master layout boards and having sub-sets thereof, each of said sub-sets having work surfaces being divided into an appropriate number of columns corresponding to a master layout board within the master layout board set, said replicas being constructed of heavy paper, card stock or the like capable of being written upon with a pencil or the like, said replicas being utilized to sketch a preliminary page layout or dummy for transfer to the said master layout board utilizing the above described sets of nameplates, flags, or logos, headlines and artwork as overlays on the master layout board to simulate the completed publication page as needed.

DESCRIPTION OF DRAWINGS

FIG. 7 is a face view of a blank miniature master layout board replica, for use in preliminary layout drafting where column dimensions, quantity and depth are not known.

FIG. 8 is a fragmentary face view of an artwork set for simulating pictures and the like on a master layout board shown in FIGS. 1 and 2, said art-work overlays being detachably and adhesively mounted on an artwork set carrier board.

FIGS. 9 and 10 are fragmentary views of headline sets showing arrangements of Italic simulating printed matter (FIG. 9) and Bodoni simulating printed matter (FIG. 10) in various type sizes, said sets being detachably and adhesively mounted on set carrier boards.

FIG. 11 is a fragmentary face view of a flag, nameplate logo simulating set, showing a plurality of sizes of overlays for use in simulating flags, nameplates or logos detachably and adhesively mounted on a flag, nameplate or logo set carrier board.

DESCRIPTION OF A PREFERRED EMBODIMENT

Referring now to the FIGS. 1 through 11 of the drawings examples of individual component parts of a master layout board set, a flag, nameplate or logo set, a headline set, an art-work set and a dummy or miniature layout board replica, which in combination comprise the Journalist Teaching Aid, are shown.

Figure 1:
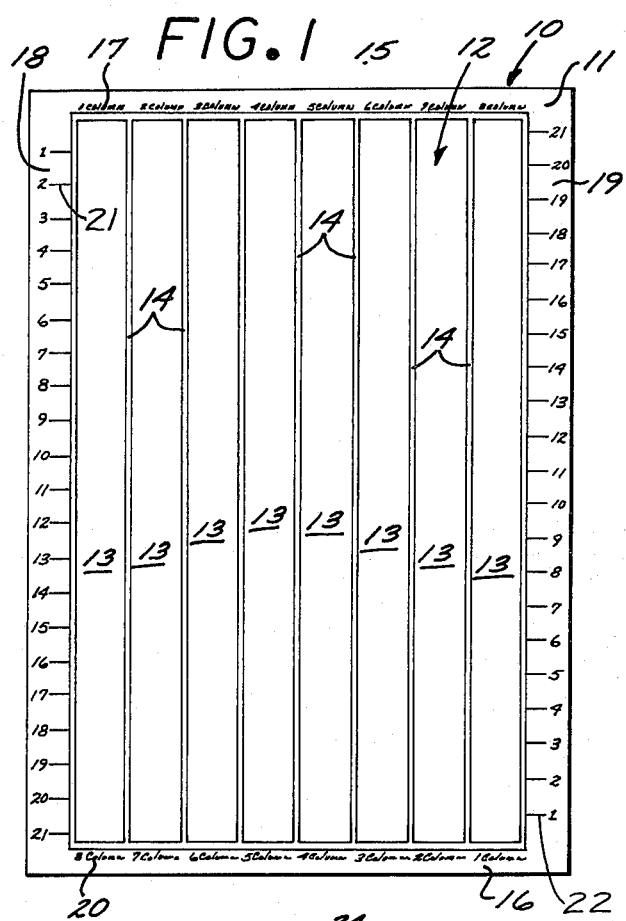
FIG. 1 is a face view of a master layout board showing a work surface divided into substantially equal columns across a length of the layout board and being numbered down a depth of the layout board along right and left margins thereof, and having column number designations along top and bottom margins thereof.

Referring more particularly to FIG. 1 an example of a master layout board 10 is shown comprising a rectangular shaped relatively thin sheet 11 of material constructed on any of a class of materials comprising plastics, epoxy coated paper, wood or metal, glossy paper or painted wood or metals, being prepared so as to permit detachably adhesively mounting adhesive backed materials on a front work surface 12 thereof and in the alternative on a back work surface (not shown) opposite the front work surface. The work surface is divided into substantially equal columns 13 by dividing strips 14 extending from a top margin 15 to a bottom margin 16 thereof, said top margin having columns numbering 17 consecutively and increasing from a left margin 18 to a right margin 19 and said bottom margin having column numbering 20 consecutively decreasing from the left margin to the right margin, said left margin having a plurality of left margin page depth markers 21 extending equidistantly from the top margin to the bottom margin being consecutively increasingly numbered from the top to the bottom margin and representing layout inches of depth. The right margin 19 has right margin numbered page depth markers 22 in horizontal alignment with said left margin page depth numbered markers 21 being consecutively increasingly numbered from the bottom margin to the top margin. The master layout board shown is representative of an eight column wide newspaper page having a depth of 21½ inches. The said columns 13 have a hue or shade different from the said dividing strips 14 for simulating printed story matter. Other members of the set (not shown) are similarly constructed to the master layout board described herein as FIG. 1, except the work surface is divided into a plurality of columns being more or less than eight (as shown) to represent other types of publications and the left and right margins will have a plurality of page depth numbered markers having a number thereof for each master layout board of the set consistent with the type of publication for which a layout is desired, said set may include all of the class of publications comprising newspapers, magazines, tabloids, yearbooks, manuals, pamphlets, and books or the like.

Figure 3:
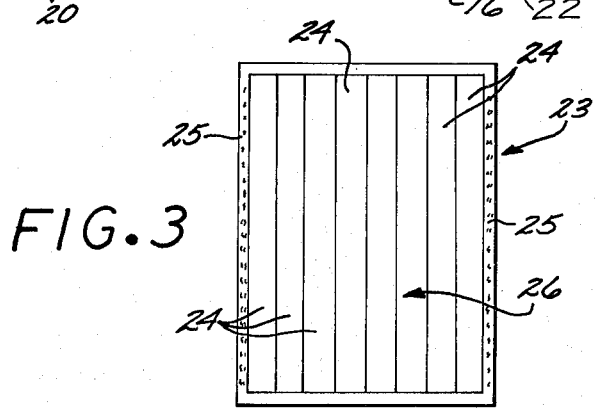
FIGS. 3, 5 and 6 are face views of miniature layout board replicas of the master layout board having various column arrangements depicted thereon and numbers designating inches of depth of a publication page for which the replica is to be used to simulate.
Figure 5:
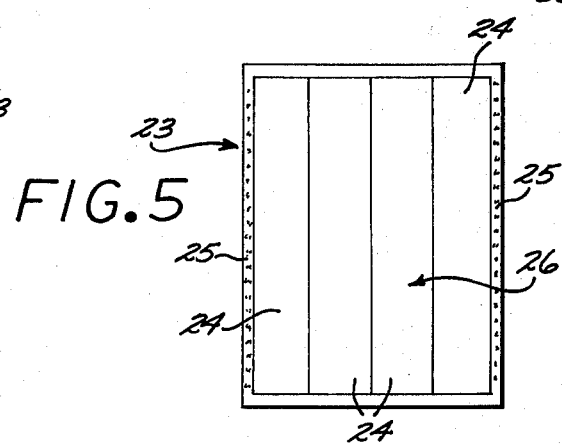
Figure 4:
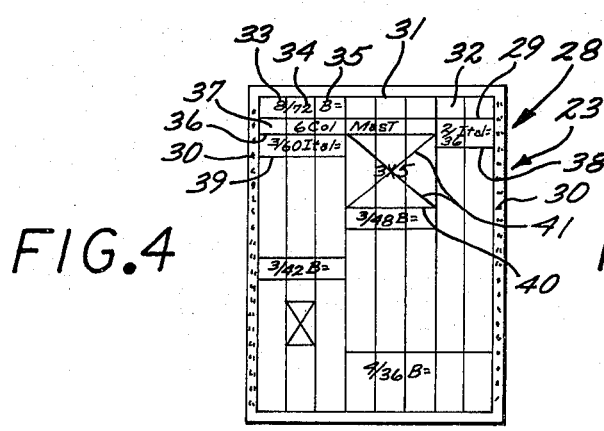
FIG. 4 is a face view of a miniature replica of a master layout board showing a manner of use thereof for simulating a publication page layout to form a dummy page thereof.
Figure 6:
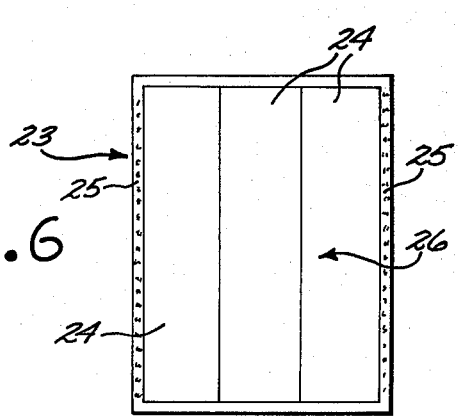

Referring the FIGS. 3, 5 and 6, examples of individual, components of sets of miniature master layout board replicas 23 are shown, having work surfaces thereon divided into replica columns 24 and having left and right margin page depth numbered markers 25 consistent with a master layout board represented by the replica. FIG. 3 showing a replica of a master layout board shown in FIG. 1. The individual miniature master layout board replicas described comprise relatively thin rectangularly shaped sheets of heavy paper, cardstock or the like, usually having a work surface 26 having a surface area of from one-half to one-fourth of the master layout board to which it corresponds. FIG. 7 shows an unlined (blank) miniature layout board replica 27 for use where column widths and depths are to be composed by the student without regard to standardized requirements. Referring to FIG. 4 an example of a dummy page 28 is shown employing a miniature layout board replica 23 as described in FIG. 3. Methods for preparing dummy pages 28 are well known in the art as are the use of miniature layout board replicas. Further referring to FIG. 4 a method for preparing a dummy page may be described comprising setting of spaces by drawing a first line 29 across the width of the miniature layout board replica eight columns wide and one and one-half page depth markers 30 down from a top margin inner border line 21 forming a nameplate space 32 thereby, identifying said space as to column width (numeral 8 herein) 33, print point size (numerals 72 herein) 34 and print style (B for bodoni herein) 35 in the manner shown in FIG. 4, drawing a second line 36 below said first line extending for a width of six columns, identifying a second space 37 therebetween — herein in FIG. 4 — 6 column masthead, drawing a third line 38 extending across columns seven and eight and identifying a third space between said first line and said third line as to number of columns, print point size and print style (herein 2/36 Ital meaning 2 columns wide, print size 36 point and print style Italic), drawing a fourth line 39 extending across columns one, two and three being below said second line one and one half page depth markers and identifying a fourth space therebetween as shown as to column width, print point size and print style, drawing a fifth line 40 extending across columns four, five and six and being below the second line five page depth markers and further drawing diagonal line 41 across a sixth space between said second line and said fifth line and identifying said sixth space with the numerals 3 × 5 representing therewith a picture of three columns wide and five depth markers deep, said setting off spaces continuing in like manner until a desired dummy page (page layout) is drafted.

Referring to FIG. 8 an example of an art work simulating set for simulating pictures and the like is shown comprising a plurality of relatively thin adhesively backed rectangularly shaped sheets being constructed of any of the class of materials comprising glossy paper, plastic or epoxy coated paper, or plastics such as mylar and the like having imprinted on a front face 43 thereof diagonal lines 44 thereon and having on a back face thereof a relatively thin pressure-sensitive adhesive coating 45, said plurality of rectangularly shaped sheets representing a plurality of various sizes of artwork or pictures consistent with the publishing art having a range of dimensions within a range of widths of one-half master layout board column wide through four master layout board columns wide and within a range of depths of one-half inch deep through six inches deep, said artwork or pictures having a shade lighter or darker than the master layout column shade and being detachably and adhesively mounted on an artwork set carrier board 46 being constructed of a material or materials as described for constructing the aforesaid master layout board set and having mounting surface 47 thereon such that said art work sheets may be readily detached therefrom and readhesively mounted thereon successively, said carrier board having flexibly attached thereto at a top portion 48 thereof a relatively thin flexible carrier board cover sheet 49.

Referring to FIGS. 9 and 10, examples of headline simulating sets are shown comprising a plurality of adhesively backed headline simulating strips 50 for simulating headlines one through eight columns wide and one-fourth inch through 4 inches deep each of said strips having on a front surface 51 thereof printing, each strip representing a particular printing point size 52 and a particular printing style 533 as shown in the drawings. The headline simulating strips are constructed otherwise similarly to and of similar materials as the said artwork sheets, being mounted on a headliner simulating strip carrier 54 constructed similarly to that described for the art-work simulating sheet carrier having print size and style designators 55 imprinted along a left margin 56 thereof as shown. The headline simulating strips may have imprinted thereon, one strip for each print style and size, a plurality of print styles and sizes including printpoint sizes such as but not limited to 14, 18, 24, 30, 36, 42, 48, 60 or 72 and print styles such as Bodoni, Italic Optima, Corona, Garamond, Spartan, Roman, Memphis, Gothic, expanded, condensed, Cheltenham, Cairo and Cameo and the like.

Referring to FIG. 11 an example of a flag, nameplate or logo set for simulating flags, nameplates or logos one through eight master layout board columns wide and one-half through 4 inches deep is shown. The set comprises a plurality of adhesively backed flag, nameplate or logo simulating strips 57 adhesively and detachably mounted on a flag nameplate or logo set carrier 58, said strips having a pressure-sensitive adhesive on a back face 59 thereof and having printed on a front face 60 thereof a distinctive border line 67 or other printing descriptive of a flag, nameplate, or logo for a publication. The strips are mounted on a set carrier constructed similarly to that used for the art-work set and the flag, nameplate, or logo strips are constructed otherwise similarly to and of similar materials as the said art-work simulating sheets.

THE METHOD OF USING THE JOURNALIST TEACHING AID

First a dummy page, an example being shown in FIG. 4, being a diagram of a page layout showing locations of stories, headlines and headings, illustrations, advertisements and the like is prepared. The procedures employed in using an appropriate miniature layout board replica are currently used and are well known in the publishing industry, said procedures having been described above with regard to FIG. 4.

Figure 2:
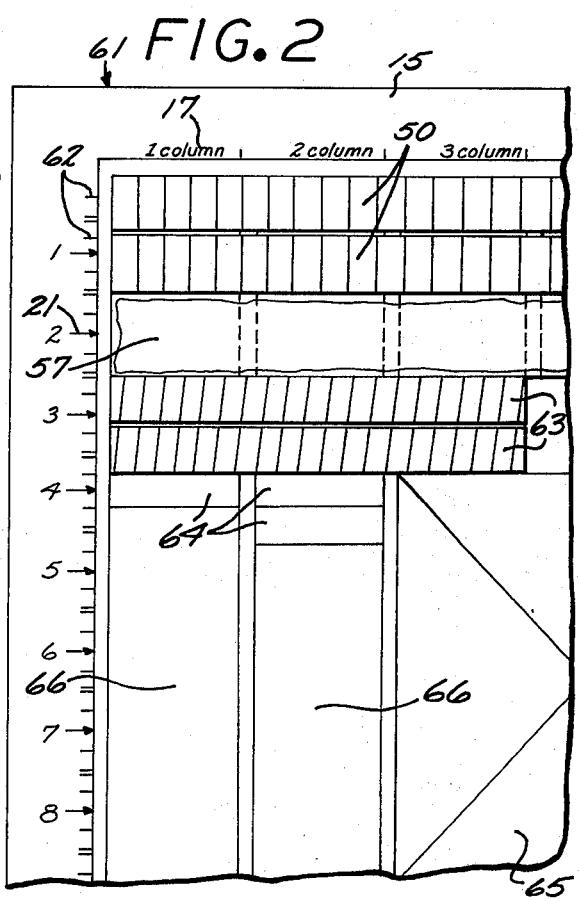
FIG. 2 is a fragmentary face view of a master layout board having simulated headline overlays and simulated art-work overlays mounted thereon with columns of the layout board simulating printed matter, said figure showing a manner of utilizing the invention described herein.

Referring to FIG. 2, a fragmentary face view of a master layout board 10 is shown having mounted thereon a completed page layout 61. The layout information on a completed dummy page (the one representing FIG. 2 is not shown) is transferred to a master layout board 10; by a first step of removing two headline simulating strips 50 from the headline simulating set carrier 54, and overlaying said headline simulating strips across a master layout board work surface top portion 62, thus representing headlines described on the dummy page layout; by a second step of removing a flag, nameplate or logo simulating strip 57 from a flag, nameplate, or logo simulating strip carrier 58 and overlaying said flag, nameplate, or logo simulating strip across the master layout board work surface beneath said headline simulating strips, as shown thus simulating a newspaper title in this example; by a third step of removing from the headline simulating set carrier 54 a second two headline simulating strips 63 and overlaying said second two headline simulating strips across the master layout board cork surface beneath the said flag simulating strip 57 as shown thus simulating headlines of lesser importance that those at the said top portion; by a fourth step of removing three headline simulating strips 64 from said strip carrier, said strips having smaller print point and column width than those used for first and third steps, described herein above, and in accordance with representations on the dummy page layout (not shown) of which said completed master layout is representative, and overlaying each of said three headline simulating strips as shown thus simulating story headings; by a fifth step of removing an art-work simulating sheet 65 from the art-work simulating set carrier board 46 and overlaying said sheet 65 in an appropriate position on said master layout board as represented by the dummy page layout; and leaving columns 66 blank thereby representing printed story matter. After use of the completed master layout is no longer required, the overlaying simulating strips and sheets are removed therefrom and returned to the appropriate set carrier board and stored thereon.

I claim as my invention:

1. A method of preparation of a full size publication page makeup layout representing a prepared dummy page layout, said dummy page layout further representing a proposed publication page of a class of publications comprising newspapers, tabloids, magazines, pamphlets, manuals, yearbooks, annuals and books, said method comprising:

a. providing a master layout board set, said set comprising a plurality of master layout boards, said plurality including therewithin master layout boards having rectangular dimensions including a range of dimensions representative of a class of proposed publications comprising newspapers, tabloids, magazines, pamphlets, manuals, yearbooks, annuals and books each of said master layout boards having a work surface thereon being divided into substantially equal columns by column dividing strips extending from a master layout board top portion to a master layout board bottom portion, said columns being representative of a column, said columns having a shade or hue differing from the column dividing strips thereby simulating printed matter between the column dividing strips, said master layout boards being constructed of any of the class of materials comprising plastics, epoxy coated paper, epoxy coated card stock, wood, metal, glossy paper, glossy card stock, painted wood and painted metals, said work surface having a surface preparation thereon to permit detachably adhesively mounting pressure sensitive, adhesively backed materials thereonto;

b. providing an art work simulating set, comprising a plurality of art work simulating sheets, each of said sheets comprising a relatively thin pressure sensitive adhesively backed rectangularly shaped sheet being constructed of any of the class of materials comprising, glossy paper, plastics, plastic coated paper, epoxy coated paper, plastic coated card stock or epoxy coated card stock, said art-work simulating sheets having imprinted on a front face thereof printing indicative of art-work, said plurality of art work simulating sheets including therewithin art-work simulating sheets having rectangular dimensions representing a variety of sizes of art-work or pictures consistent with the publishing art having a range of dimensions within a range of widths of one-half master layout board column wide through four master layout board columns wide and within a range of depths of one-half inch deep through 6 inches deep;

c. providing a headline simulating set comprising a plurality of headline simulating strips for simulating headlines within a range of from one through eight columns wide and one-half inch through 4 inches deep, said strips each comprising a relatively thin pressure sensitive adhesively backed elongate retangularly shaped strip constructed of any of the class of materials as set forth for the construction of the said art-work simulating sheets, said headline simulating strips having on a front face thereof headline simulating printing, including a range of print styles comprising Bodoni, Italic, Optima, Corona, Garamond, Spartan, Roman, Memphis, Gothic, expanded, condensed, Cheltenham, Cairo and Cameo, said plurality of strips further including therewithin printing point sized throughout the range generally used in the publishing art including point sizes of 14, 18, 24, 30, 36, 42, 48, 60 and 72;

d. providing a flag, nameplate, or logo simulating set comprising a plurality of flag, nameplate or logo simulating strips for simulating flags, nameplates, or logos within the range of from one through eight columns wide and one-half through 4 inches deep, each of said flag, nameplate or logo similating strips having imprinted on a flag, nameplate, or logo simulating strip front face printing distinctively setting said flag, nameplate, or logo simulating strips apart from the said headline simulating strips, said flag, nameplate, or logo simulating strips being otherwise similar in construction to that set forth above for the said construction of headline simulating strips; and e. detachably adhesively mounting said headline simulating strips, said flag, nameplate or logo simulating strips, and said art-work simulating sheets onto a work surface of a master layout board, said board having dimensions representative of a proposed publication page being represented by a prepared dummy page layout, said mounting of said strips and sheets conforming with information set forth on the prepared dummy page layout, said mounted strips and sheets overlaying columns on the master layout board in conformity with the dummy page layout leaving uncovered columns on the master layout board work surface representing printed story matter of the proposed publication page.

2. A journalist teaching aid comprising in combination:

a master layout board set, said set comprising a plurality of master layout boards, said plurality of boards including therewithin master layout boards having rectangular dimensions representative of a class of proposed publications comprising newspapers, tabloids, magazines, pamphlets, yearbooks, annuals and books, each of said master layout boards having a work surface thereon being divided into columns by column dividing strips extending from a master layout board top portion to a master layout board bottom portion, said columns formed therebetween being representative of printed story matter columns of a publication page, said master layout boards being constructed of relatively thin sheets of any of the class of materials comprising plastics, epoxy coated paper, epoxy coated card stock, wood, metal, glossy paper, glossy card stock, plastic coated paper, plastic coated card stock, painted wood, and painted metals, said work surface having surface preparation thereon to permit detachably adhesively mounting pressure sensitive adhesive backed materials thereonto;

an art-work simulating set, comprising a plurality of art work simulating sheets, each of said sheets comprising a relatively thin pressure sensitive adhesive backed rectangularly shaped sheet constructed of any of the class of materials comprising glossy paper, plastics plastic coated paper, epoxy coated paper, plastic coated card stock epoxy coated card stock, plastic coated thin metal sheets or epoxy coated thin metal sheets, said plurality of art-work simulating sheets including therewith in art-work simulating sheets having rectangular dimensions representative of a variety of sizes of art-work or pictures consistent with the publishing art and having within said plurality of sheets a range of widths corresponding to one-half master layout board column width through four column widths and within a depth range of from one-half inch deep through 6 inches deep said art-work sheets for simulating art-work when detachably adhesively mounted on a master layout board;

a headline simulating set comprising a plurality of headline simulating strips for simulating headlines one through eight master layout board columns wide and one-fourth inch through 4 inches deep, each of said strips comprising a relatively thin pressure sensitive adhesive backed elongate rectangularly shaped strip being constructed of any of the class of materials as set above for the construction of the said art-work simulating sheets, said headline simulating strips having on a front side thereof headline simulating printing, said headline simulating strips for simulating headlines and story headings when detachably adhesively mounted on a master layout board;

a flag, nameplate or logo simulating set, comprising a plurality of flag, nameplate or logo simulating strips for simulating flags, nameplates or logos one through eight master layout board columns wide and one-half inch through 4 inches deep, each of said flag, nameplate or logo strips having on a front face thereof printed matter distinctively setting apart said flag, nameplate or logo strips as such, said strips being otherwise similar in construction to that set forth above for construction of said headline strips, said flag, nameplate or logo strips for simulating a publication name or logo when detachably adhesively mounted on a master layout board; and one or more art-work simulating sheet, headline simulating strip and flag, nameplate or logo simulating strip carrier board for detachably adhesively mounting thereon said sheets and strips for storage when said sheets and strips are not in use, said carrier boards comprising a mounting member being constructed of a relatively thin sheet of any of the class of materials set forth for the construction of the master layout board and having hingingly attached at a top thereof a relatively thinner carrier board cover sheet.

3. A journalist teaching aid as set forth in claim 2 wherein the master layout board columns between said column dividing strips are grey to simulate printed matter.

4. A journalist teaching aid as set forth in claim 2 wherein said art-work simulating sheets are a darker shade of grey than said columns.

5. A journalist teaching aid as set forth in claim 2 wherein said plurality of headline simulating strips having included therewithin headline simulating printing including a range of print styles comprising Bodoni, Italic, Optima, Corona, Garamond, Spartan, Roman, Memphis, Gothic, Expanded, Condensed, Cheltenham, Cairo, Cameo and the like, said plurality of headline simulating strips having further included therein printing point size including 14, 18, 24, 30, 36, 42, 48, 60, and 72 point printing.

6. A journalist teaching aid as set forth in claim 2 wherein the flag, nameplate, or logo simulating strips have a border line imprinted on each of said plurality of said strips for differentiating said strips from art-work sheets and headline strips.

7. A journalist teaching aid as set forth in claim 2 wherein said master layout boards have a borderline imprinted thereon having said columns therewithin and having column numbering at column tops and column bottoms as shown and further having on right and left borders depth designator marks representing icrements of depth with respect to a column top to a column bottom as shown.

8. A journalist teaching aid as set forth in claim 2 wherein one or more of the said carrier boards have imprinted thereon along a right margin of said mounting member print style and point designators for labeling positions for mounting headline simulating strips as shown.

\* \* \* \* \*